(12) United States Patent
Kopp et al.

(10) Patent No.: US 9,718,335 B2
(45) Date of Patent: Aug. 1, 2017

(54) CONVERTIBLE VEHICLE TOP HAVING A STORAGE SPACE LID

(71) Applicant: Webasto-Edscha Cabrio GmbH, Stockdorf (DE)

(72) Inventors: Georg Kopp, Stockdorf (DE); Franz Haberl, Stockdorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 15/197,985

(22) Filed: Jun. 30, 2016

(65) Prior Publication Data

US 2017/0001500 A1    Jan. 5, 2017

(30) Foreign Application Priority Data

Jul. 2, 2015  (DE) .................. 10 2015 110 692

(51) Int. Cl.
*B60J 7/20*    (2006.01)
*B60J 7/12*    (2006.01)

(52) U.S. Cl.
CPC .............. *B60J 7/202* (2013.01); *B60J 7/1265* (2013.01)

(58) Field of Classification Search
CPC ................................ B60J 7/202; B60J 7/1265
USPC ....................... 296/107.08, 107.07
See application file for complete search history.

(56) References Cited

U.S. PATENT DOCUMENTS

| | | | | |
|---|---|---|---|---|
| 6,318,792 B1* | 11/2001 | Neubrand | ................ | B60J 7/202 296/107.08 |
| 6,736,445 B2 | 5/2004 | Obendiek | | |
| 2003/0020298 A1* | 1/2003 | Koch | ..................... | B60J 7/203 296/107.08 |
| 2004/0056508 A1* | 3/2004 | Nania | ..................... | B60J 7/203 296/136.06 |
| 2009/0102228 A1* | 4/2009 | Hinrichs | .................... | B60J 7/19 296/107.08 |
| 2011/0227364 A1* | 9/2011 | Neubrand | ............. | B60J 7/1265 296/108 |
| 2016/0167496 A1* | 6/2016 | Sviberg | ................... | B60J 7/061 296/107.07 |
| 2016/0221425 A1* | 8/2016 | Haberl | .................. | B60J 7/1204 |

(Continued)

FOREIGN PATENT DOCUMENTS

| | | |
|---|---|---|
| DE | 4445941 C1 | 3/1996 |
| DE | 19714105 A1 | 10/1998 |
| DE | 10020663 A1 | 11/2001 |

(Continued)

*Primary Examiner* — Jason S Morrow
(74) *Attorney, Agent, or Firm* — Quarles & Brady LLP (57) ABSTRACT

A top of a convertible vehicle includes a top linkage adjustable between a closed position and a storage position. The top linkage is stored in a rear-side top storage space, which is closable by a storage space lid, which is pivotably mounted on a vehicle-fixed single-part or multipart main bearing via a link mechanism on each of its two sides with respect to a vertical longitudinal center plane of the top. The top linkage has a linkage mechanism on each of its two sides with respect to the vertical longitudinal center plane of the top. Each linkage mechanism is pivotably mounted on the respective vehicle-fixed main bearing driven by a main drive arranged on the main bearing. The link mechanisms of the storage space lid are arranged on both sides and driven by the main drive arranged on the respective main bearing.

14 Claims, 9 Drawing Sheets

(56) References Cited

U.S. PATENT DOCUMENTS

2017/0015181 A1* 1/2017 Wullrich ............... B60J 7/1265

FOREIGN PATENT DOCUMENTS

| DE | 10029478 A1 | 1/2002 |
| DE | 10152944 A1 | 5/2003 |

* cited by examiner

CONVERTIBLE VEHICLE TOP HAVING A STORAGE SPACE LID

CROSS REFERENCE TO RELATED APPLICATION

This application claims the priority benefit of German Patent Application No. 10 2015 110 692.2 filed on Jul. 2, 2015, which is fully incorporated herein by reference.

STATEMENT REGARDING FEDERALLY SPONSORED RESEARCH OR DEVELOPMENT

Not applicable.

FIELD OF THE INVENTION

The invention relates to a top of a convertible vehicle.

BACKGROUND OF THE INVENTION

A top of this kind is known from practice and can be designed as a folding top, which has a foldable top cover, or as a retractable hard top, which has rigid top shells. The top comprises a top linkage, by means of which, depending on the design, the top cover can be stretched or the rigid top shells can be adjusted. The top linkage is adjustable between a closed position, in which a vehicle interior of the vehicle in question is covered, and a closed position, in which the vehicle interior is open to the top and the top linkage is stored in a rear-side top storage space of the vehicle in question. The top storage space can typically be closed by means of an adjustable storage space lid, which can form a hat shelf arranged in the vehicle interior when the top is in the closed position and which is pivotably mounted on a vehicle-fixed main bearing via a link mechanism on each of its two sides with respect to a vertical longitudinal center plane of the top. The top linkage has a linkage mechanism on each of its two sides with respect to the vertical longitudinal center plane of the top, each linkage mechanism being pivotably mounted on the respective vehicle-fixed main bearing, as well, and being drivable by means of a main drive arranged on the main bearing. For adjusting the storage space lid, a separate drive motor has been provided so far, which causes costs, on the one hand, and requires a large amount of installation space, on the other hand.

SUMMARY OF THE INVENTION

The object of the invention is to provide a top of the kind mentioned above in which these disadvantages are eliminated. This object is attained according to an embodiment of the invention by the top having both the link mechanisms of the storage space lid, which are arranged on both sides, and the linkage mechanisms of the top linkage are driven by the same drive means, namely by the main drives arranged on the respective main bearings. Thus, the top according to the invention can be produced at lower cost compared to previous solutions. Also, no additional installation space is required for a drive of the storage space lid. Instead, the main drive and the respective link mechanism of the storage space lid are coupled.

In a specific embodiment of the top according to the invention, the main drive drives a drive wheel, which is rotatably mounted on the respective main bearing and connected to the respective link mechanism of the storage space lid via a first drive link mechanism and connected to the linkage mechanism of the top linkage via a second drive link mechanism. Thus, each drive link mechanism is a coupling means between the drive wheel and the top component to be driven in each case.

To be able to attribute additional functionality to the main drive and to not need to provide other additional drives, the drive wheel can be connected to a rear-window link for adjusting a rear window via a third drive link mechanism, said rear-window link being pivotably mounted on the main link. Thus, three drive link mechanisms are linked to the drive wheel, allowing the main drive or the two main drives arranged at both sides to be used to adjust three structural units of the top.

In the case at hand, a drive wheel is not simply a closed wheel in the classical sense. Instead, the term drive wheel also encompasses a rigid drive link structure that is rotatably mounted on the respective main bearing and on which the link points for the drive link mechanisms are formed.

In a top that can be cost-efficiently produced, the main drive is preferably realized as an electric motor. In this case, in particular, the drive wheel can be a gear wheel or a gear wheel segment, which is driven by a drive pinion of the main drive.

To arrive at a defined path of movement of the storage space lid when adjusting the same, it is advantageous if the link mechanism of the storage space lid is a multi-joint mechanism, in particular a four-bar mechanism, which is connected to a base structure of the storage space lid. Two links of the four-bar mechanism are thus connected to the base structure of the storage space lid and are linked to the main bearing at their ends facing away from the base structure.

In specific applications, in which a part of the top, such as the top cover or a rear window, dives into the top storage space through a gap between the storage space lid and another vehicle element, such as a trunk lid, in the closed position of the top, it may be necessary for the storage space lid to have a lid plate that can be lowered and which is pivotably mounted on the base structure. In that case, when top is in the closed position, the lid plate assumes a lowered position in which the gap is formed, whereas it assumes a normal position in which the gap is closed when the top is in the storage position.

In another specific embodiment of the top according to the invention, the storage space is provided with a linkage exit flap on each of its two sides with respect to the vertical longitudinal center plane of the top, said linkage exit flap being swung downward into an open position when the top linkage is in the closed position and being pivotable into a cover position, in which the storage space is covered, when the top linkage is in the storage position, so that the linkage exit flaps are aligned with a middle part of the storage space lid. The linkage exit flaps are lateral wing-type elements of the storage space lid, which allow the top linkage to exit the top storage space when the top is in the closed position.

For adjusting the linkage exit flaps in relation to a central storage space lid element, a drive motor may be arranged on the underside of the storage space lid. The drive motor is preferably coupled to each of the linkage exit flaps via a push rod.

In order to not need another drive for lowering the lid plate into the lowered position, the drive motor, when actuated, can adjust the lid plate of the storage space lid in relation to the base structure thereof about a pivot axis, which extends in the transverse direction of the top, via a lever mechanism. The drive motor thus simultaneously actuates the linkage exit flaps and the lid plate, causing the three structural elements to pivot in relation to the base structure.

As defined by the invention, the base structure is to be understood as a substructure of the storage space lid on which the lid plate and, if applicable, the linkage exit flaps can be mounted. The base structure can be a plate in the classical sense, but also a grid structure or the like, which has mounting points for the other structural elements of the storage space lid, such as the linkage exit flaps and the lid plate, and for the link mechanism for connecting the storage space lid to the main bearings.

Another subject-matter of the invention is a convertible vehicle top that comprises a top linkage adjustable between a closed position, in which a vehicle interior is covered, and a storage position, in which the vehicle interior is open to the top and the top linkage is stored in a rear-side storage space, which can be closed by means of an adjustable storage space lid, which is provided with a linkage exit flap on each of its two sides with respect to a vertical longitudinal center plane of the top, each linkage exit flap being adjustable between an open position, in which it is swung downward, and a cover position, in which it is swung upward. The top linkage has a linkage mechanism on each of its two sides with respect to the vertical longitudinal center plane of the top, each linkage mechanism being pivotably mounted on a respective vehicle-fixed main bearing. The storage space lid comprises a base structure and a lid plate, which is pivotable in relation to the base structure, the lid plate and the linkage exit flaps being pivotable in relation to the base structure by means of a shared drive motor.

In this top, the drive motor thus has more than one function, namely the adjusting function for the lid plate and the adjusting function for the linkage exit flaps in relation to the base structure.

The drive motor, which can be arranged on the base structure, is preferably connected to each of the linkage exit flaps and the lid plate via a push rod.

To allow a three-dimensional movement of the push rods, each push rod is preferably connected to a coupling element of a drive shaft of the drive motor via a spherical head. Of course, it is also contemplated that the push rods are provided with a universal joint or the like.

To achieve a reduction of the adjusting movement of the lid plate, the push rod for the lid plate can be connected to an adjusting link mechanism, which is linked to the base structure at one side and to the lid plate at the other side.

Other advantages and advantageous embodiments of the subject-matter of the invention can be taken from the description, the drawing and the claims.

BRIEF DESCRIPTION OF THE DRAWINGS

An embodiment of a top according to the invention is illustrated in the drawing in a schematically simplified manner and will be explained in more detail in the following description. In the drawing.

DETAILED DESCRIPTION OF AN EMBODIMENT

Figure 1:
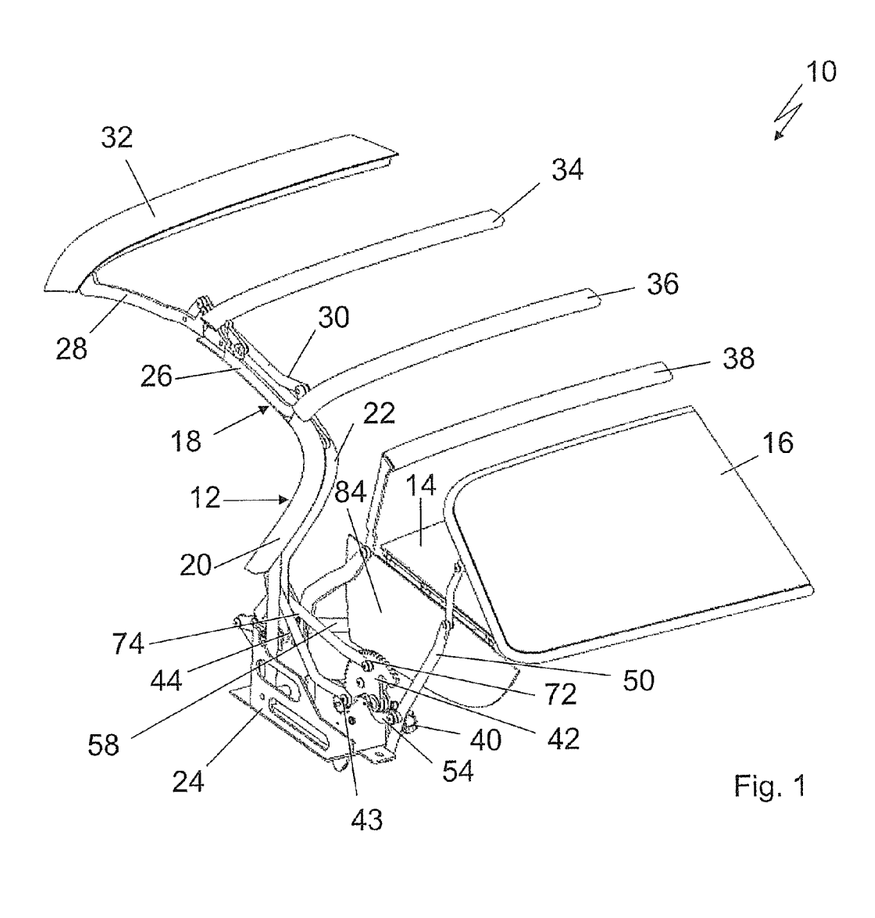
FIG. 1 shows a perspective partial view of a folding top according to the invention in its closed position.
Figure 2:
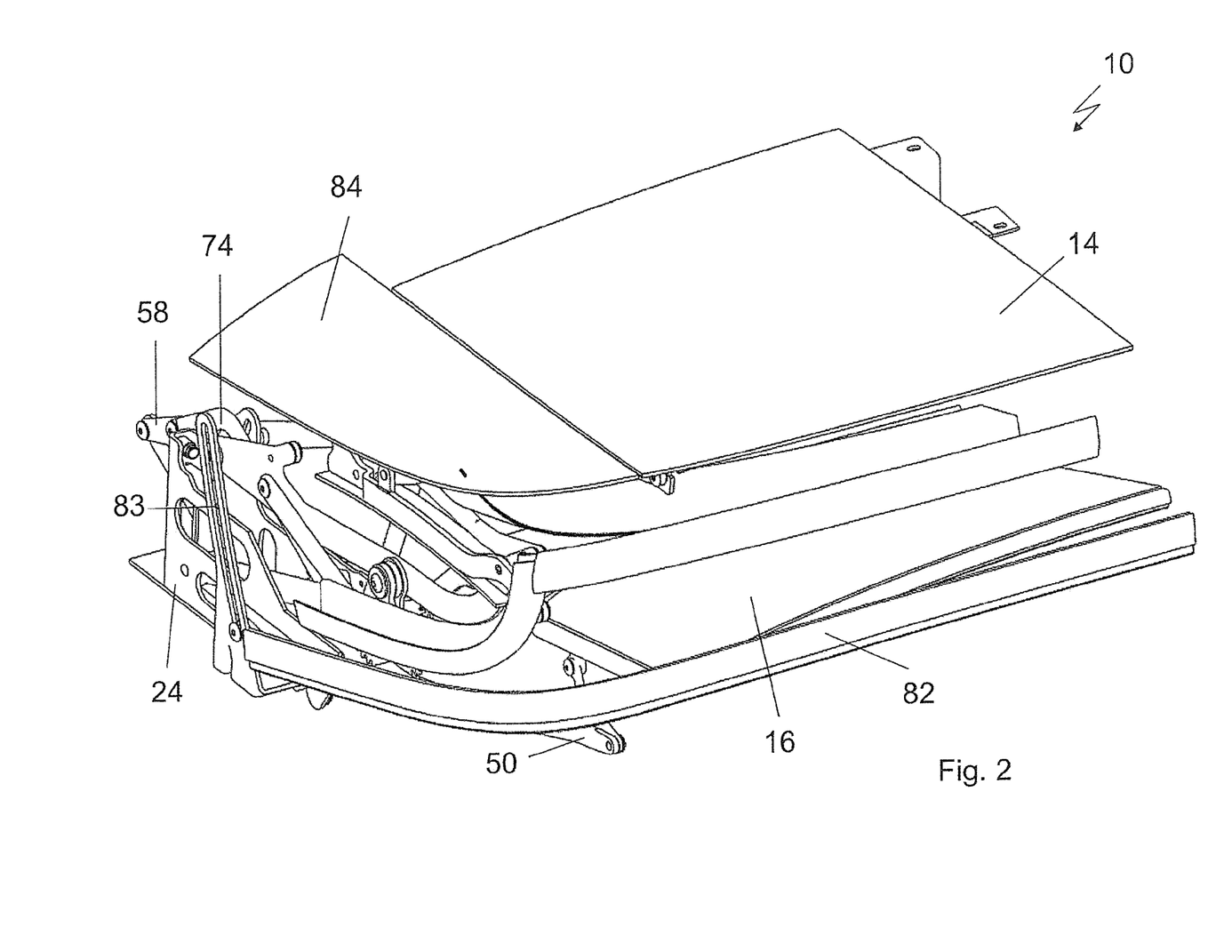
FIG. 2 shows a perspective illustration of the folding top according to FIG. 1 in its storage position.
Figure 3:
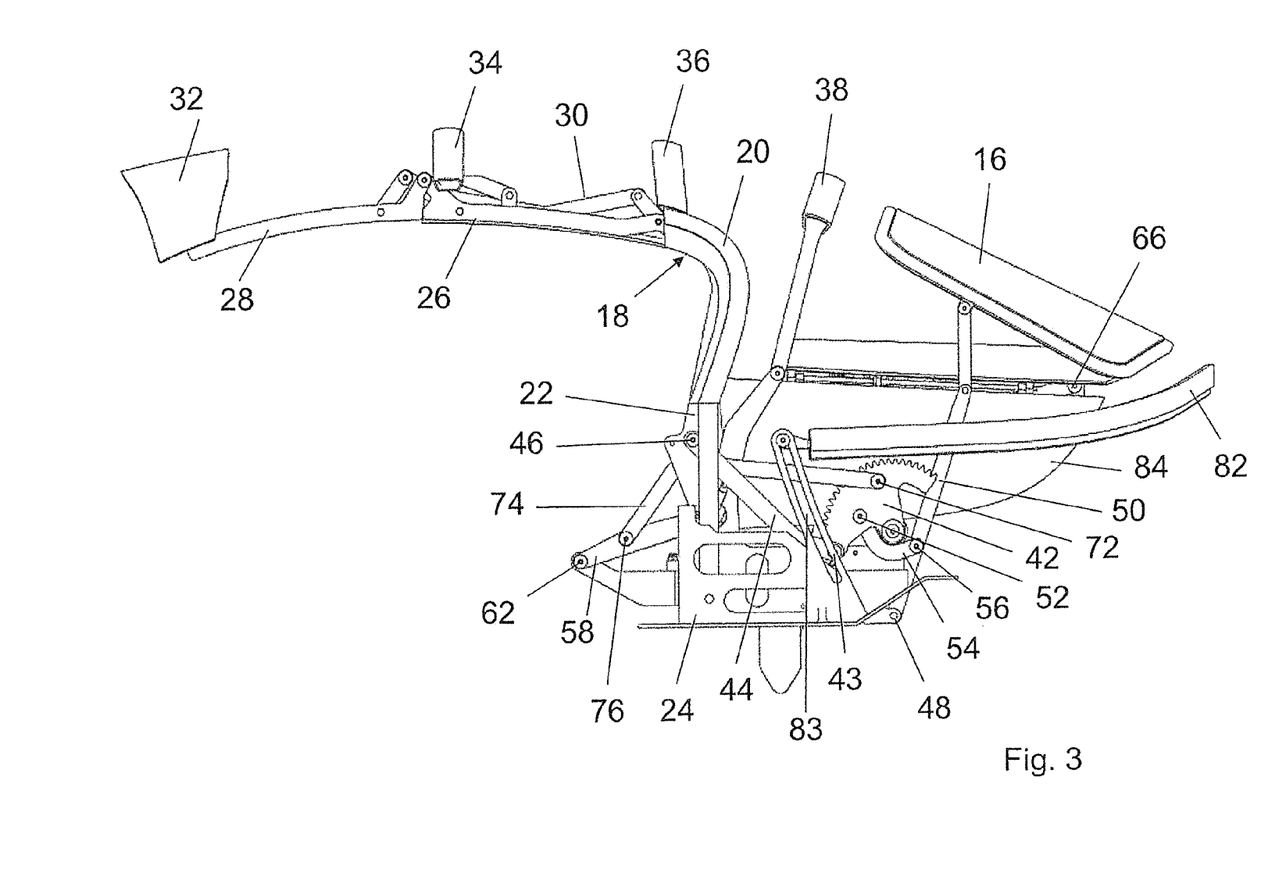
FIG. 3 shows a lateral view of the folding top in its closed position.
Figure 4:
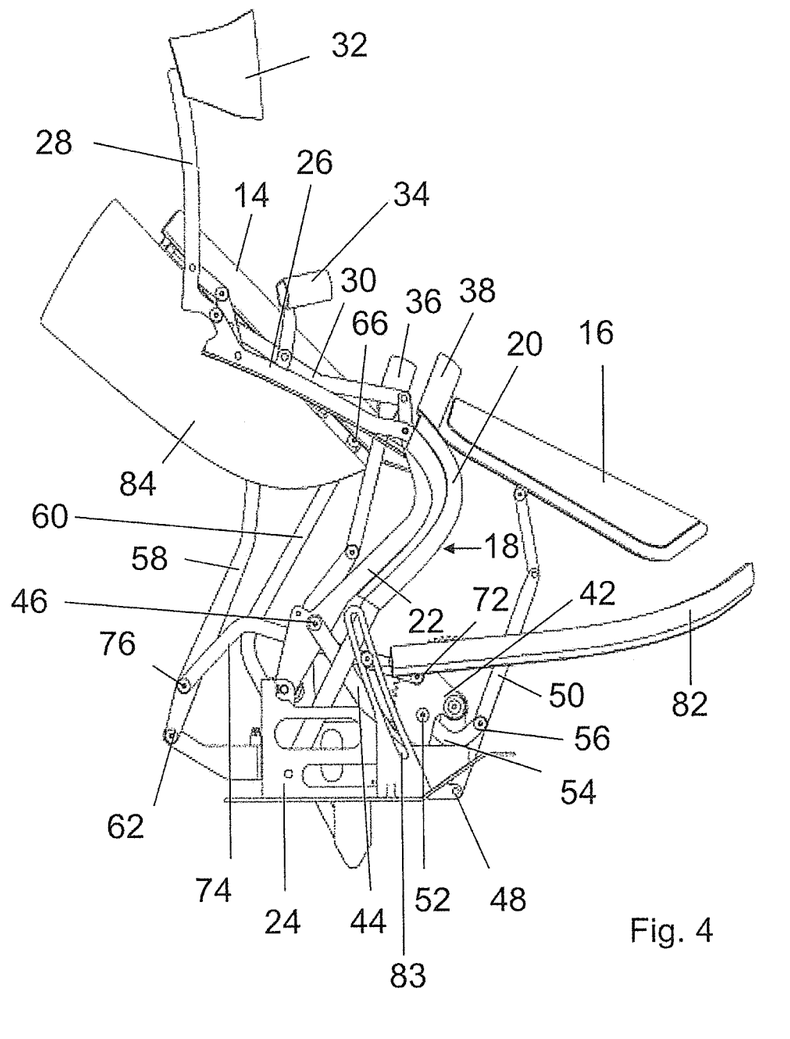
FIG. 4 shows a lateral view of the folding top according to FIG. 1 in a first intermediate position during adjustment.
Figure 5:
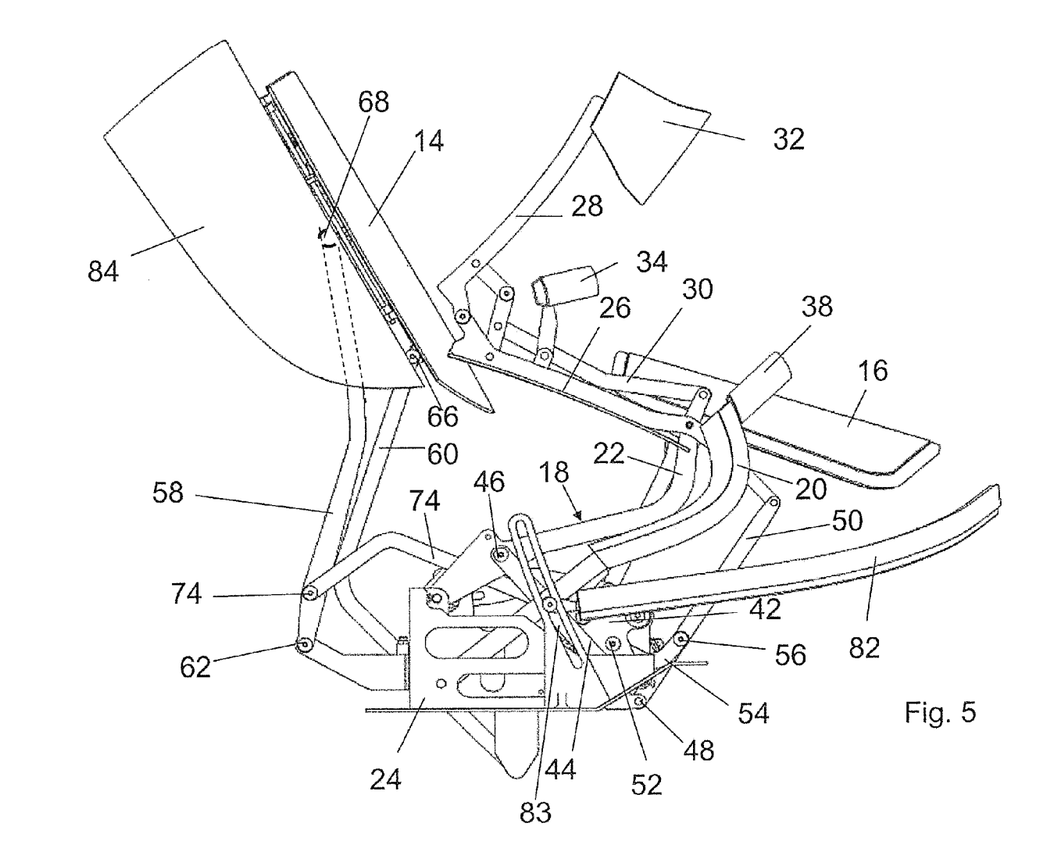
FIG. 5 shows a lateral view of the folding top according to FIG. 1 in a second intermediate position during adjustment.
Figure 6:
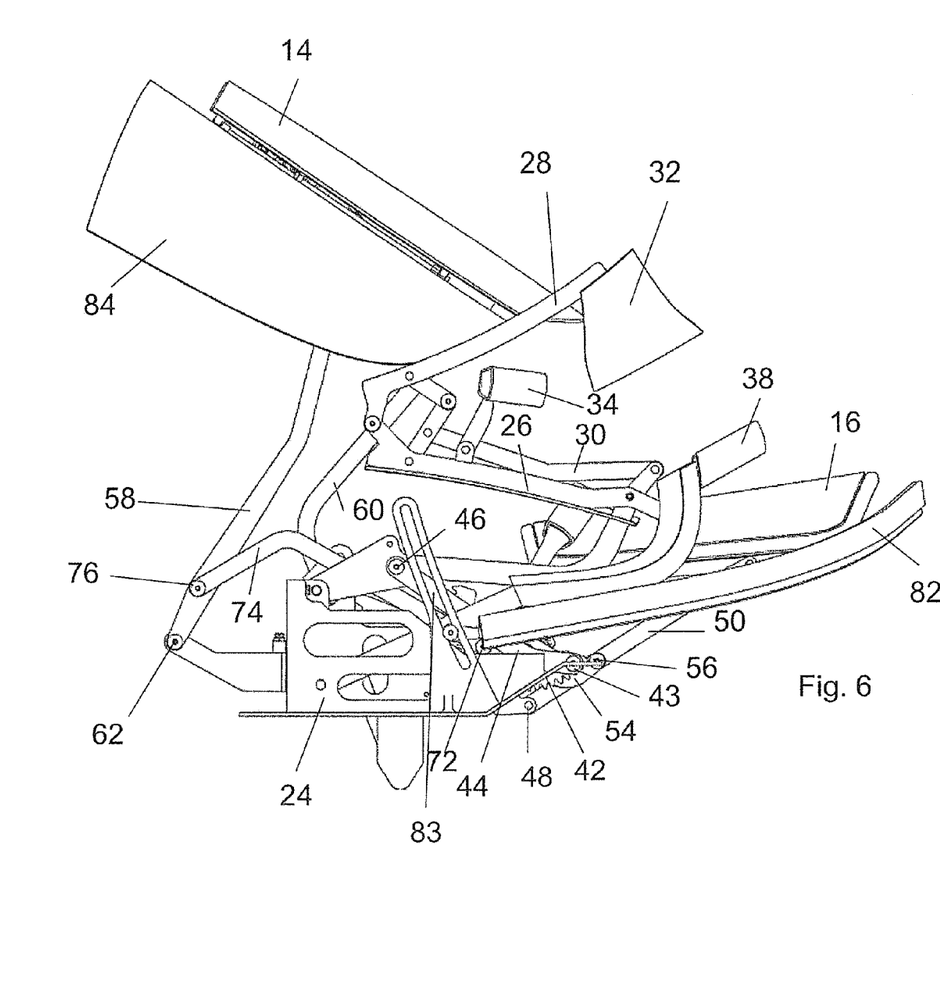
FIG. 6 shows a lateral view of the folding top according to FIG. 1 in a third intermediate position during adjustment.
Figure 7:
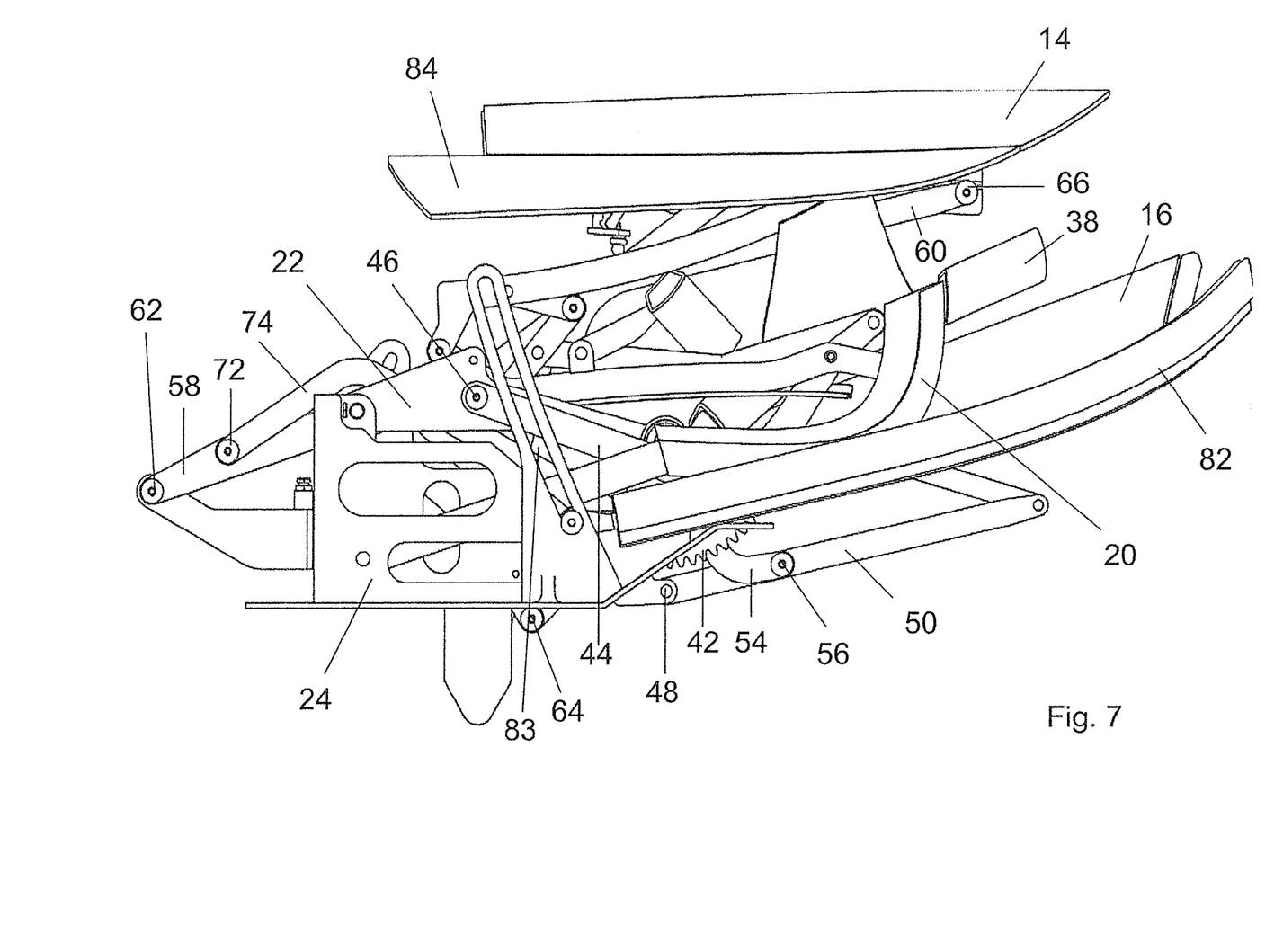
FIG. 7 shows a lateral view of the folding top according to FIG. 1 in a storage position.

The drawing illustrates a convertible vehicle top 10, which is realized as a folding top and has a top linkage 12, by means of which a top cover (not illustrated) can be stretched. The top linkage 12 is adjustable between a closed position, which is illustrated in FIGS. 1 and 3 and in which a vehicle interior of a convertible vehicle (not illustrated) is covered, and a storage position, which is illustrated in FIGS. 2 and 7 and in which the top is stored in a rear-side top storage space of the vehicle in question. The top storage space can be closed by means of a storage space lid 14, which, when the top is in the closed position, forms a rear-side hat shelf, which is accessible from the vehicle interior and arranged below a rear window 16.

For the sake of clarity, the top 10 is illustrated in the drawing based only on the areas of the top arranged on the left side with respect to the forward driving direction of the vehicle in question. The areas of the top arranged on the right side with respect to the forward driving direction are symmetrical thereto with respect to a vertical longitudinal center plane of the top and are readily apparent from the following description, as well.

The top linkage comprises a linkage mechanism 18 on each of its two sides with respect to the vertical longitudinal center plane of the top, each linkage mechanism 18 being substantially oriented in the longitudinal direction of the vehicle and having a main column 20 and a main link 22, both of which are pivotably mounted on a respective vehicle-fixed main bearing 24, which consists of a single part in the case at hand. Each linkage mechanism 18 further comprises a middle roof frame element 26 and a forward roof frame element 28. Together with the main column 20, the main link 22, and the main bearing 24, the middle roof frame element 26 forms a main four-bar. The forward roof frame element 28 is adjustable in relation to the middle roof frame element 26 by means of a coupling link mechanism 30. The adjusting movement is triggered by pivoting the main column 20 and of the main link 22.

A forward bow 32, two middle bows 34 and 36 and a so-called corner bow 38, which defines a transition between the actual roof portion of the top 10 and a rear-window portion of the top 10 in its closed position, extend between the linkage mechanisms 18 arranged on both sides.

A main drive 40, which is realized as an electric motor, is arranged on the main bearing 24 for driving the linkage mechanism 18, said main drive 40 driving a drive wheel 42 via a drive pinion, the drive wheel 42 being realized as a gear wheel segment and being pivotably mounted on the main bearing 24. A drive link 44 is linked to the drive wheel 42 at the outer side via a link point 43, the drive link end facing away from the drive wheel 42 being linked to the main link 22 via a point of articulation 46.

Furthermore, a rear-window link 50, on which the rear window 16 is mounted, is linked to the main bearing 24 via a point of articulation 48. To be able to also adjust the rear window 16 when adjusting the top 10, the drive wheel 42 has a link point 52 for a drive link 54 that is connected to the rear-window link 50 via a point of articulation 56.

The storage space lid 14 is linked to the main bearing 24 via a four-bar mechanism, which comprises two lid links 58 and 60, via two joints 62 and 64. At their ends that face away from the joints 62 and 64, the lid links 58 and 60 are linked to a base plate or base structure 70 of the storage space lid 14 via two points of articulation 66 and 68. For pivoting the storage space lid 14 in relation to the main bearing 24, the drive wheel 42 has another link point 72 for a drive link 74 that is linked to the lid link 48 in a point of articulation 76.

By linking the drive links 44, 54 and 74 to the drive wheel 42, it is thus possible to pivot both the linkage mechanism 18 and the rear window 16 as well as the storage space lid 14 in relation to the main bearing 24 by means of the main drive 40.

Figure 8:
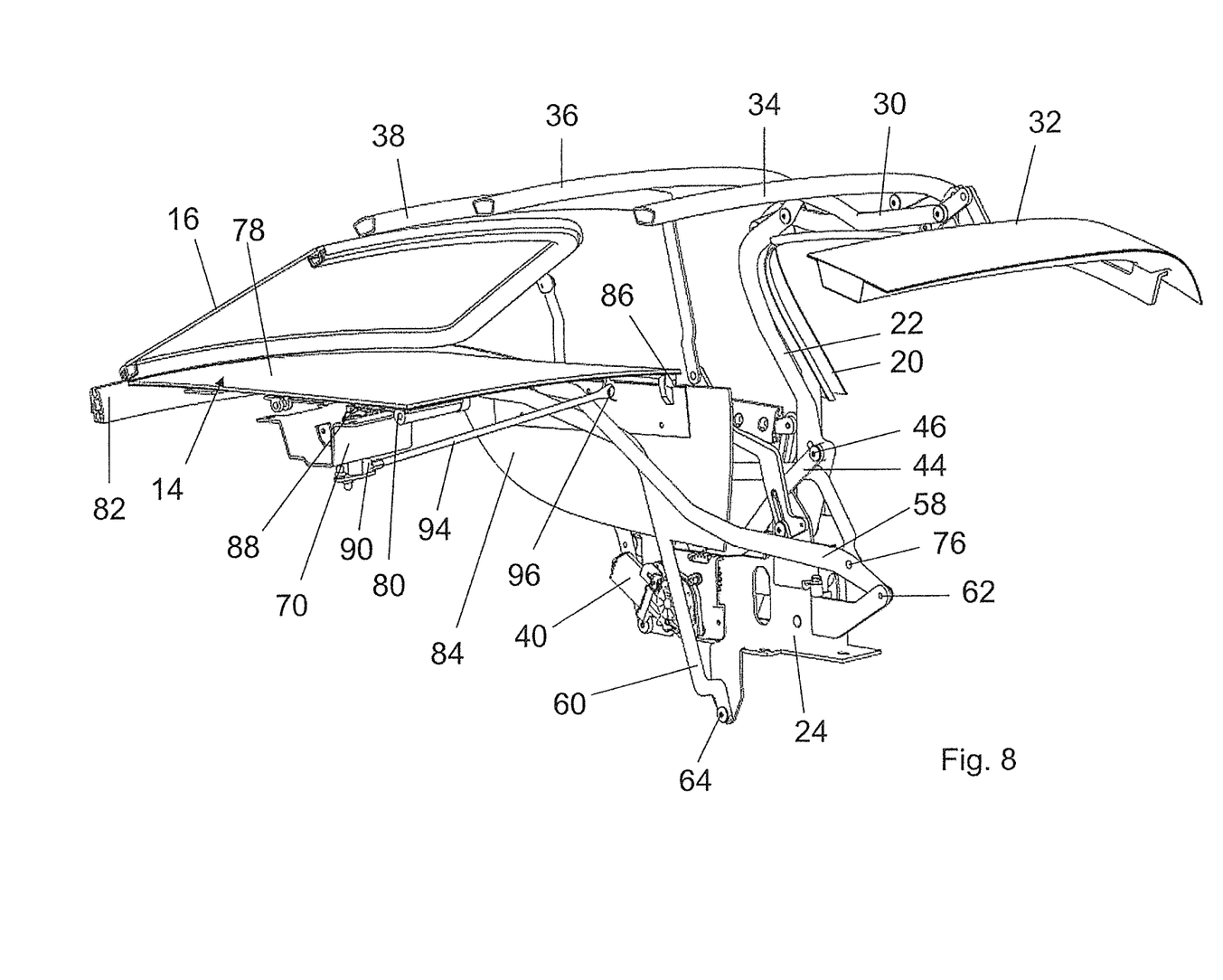
FIG. 8 shows a perspective internal view of the folding top according to FIG. 1 in its closed position.
Figure 9:
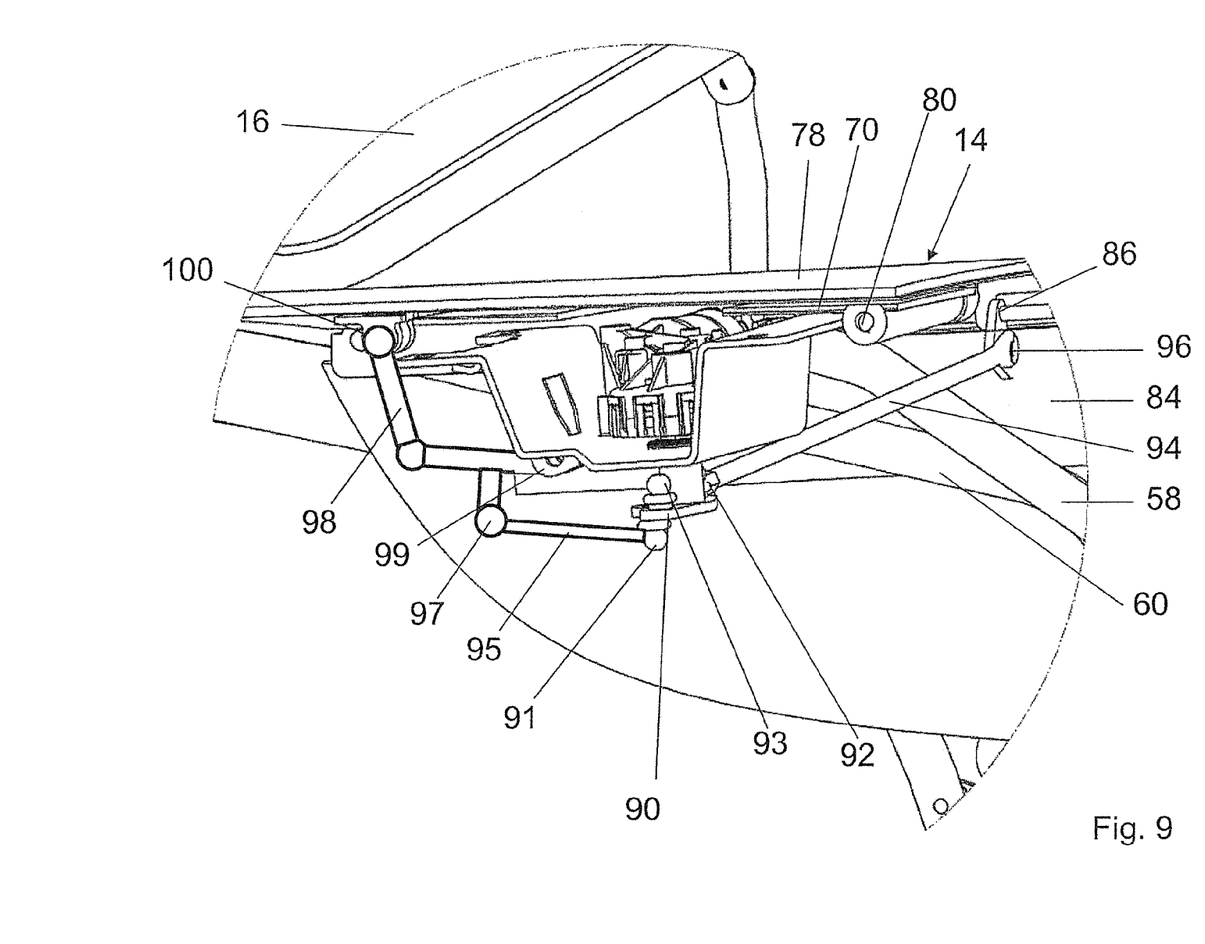
FIG. 9 shows a perspective bottom view of a storage space lid of the folding top.

As previously described above, the storage space lid 14 comprises a base plate 70, to which the roof links 58 and 60 are linked. Furthermore, the storage space lid 14 comprises a lid plate 78, which forms the visible surface of the storage space lid 14 and can be adjusted between a lowered position, which is illustrated in FIGS. 1, 3 and 8, and a lifted position, which is illustrated in FIGS. 2 and 7, via a pivot axis 80 extending in the transverse direction of the vehicle or top. In the lowered position, a gap is formed between the rear-side edge of the lid plate 78 and a body component adjacent thereto at the rear, such as a trunk lid, allowing the top cover to pass through the gap toward a rear-side tensioning bow 82, which is in contact with the rear-side component from the underside and keeps the top cover tensioned in the longitudinal direction of the top. In the lifted position of the lid plate 78 of the storage space lid 14, said gap is closed because all top linkage elements and the top cover are arranged in the top storage space. The tensioning bow 82 is pivotably mounted in guide rails 83 of the main bearings 24.

A linkage exit flap 84 is linked to the base plate 70 of the storage space lid 14 on each of its two sides with respect to the vertical longitudinal center plane of the top via a pivot axis 86, which extends in the longitudinal direction of the vehicle. The linkage exit flaps 84 are adjustable between an open position, in which they are swung downward and the linkage mechanisms 18 exit the top storage space, and a cover position (FIGS. 2 and 7), in which they are swung upward and the storage space is completely closed by the storage space lid 14. In this position, the linkage exit flaps 84 are aligned with the lid plate 78, which forms a middle part of the storage space lid 14.

To be able to pivot the linkage exit flaps 84 and the lid plate 78 together in relation to the base plate 70, a drive motor 88 is attached to the base plate 70, whose drive shaft is provided with a multi-coupling element 90, which has three spherical heads 91, 92 and 93, to each of which a push rod 94 or 95 is linked, only the push rod for one of the linkage exit flaps 84 being illustrated in the drawing. Each push rod 94 leads to a joint 96 of the respective linkage exit flap 84. Push rod 95 leads to a joint 97, which is realized on a lever mechanism 98, which is formed by two levers articulated to each other and which is linked to the base plate 70 via a joint 99 at one side and to the lid plate 78 via a joint 100 at the other side.

Actuating the drive motor 88 thus causes the linkage exit flaps 84 arranged at both sides and the lid plate 78 to pivot in relation to the base plate 70 via the multi-coupling element 90 and the push rods 94 and 95.

The invention claimed is:

1. A top of a convertible vehicle, said top comprising:
   a top linkage adjustable between a closed position, in which a vehicle interior is covered, and a storage position, in which the vehicle interior is open to the top and the top linkage is stored in a rear-side top storage space;
   a storage space lid pivotably mounted on a vehicle-fixed single-part or multipart main bearings and closable over the rear-side storage space;
   a link mechanism on each of opposing sides of the storage space lid with respect to a vertical longitudinal center plane of the top, each link mechanism pivoting said storage space lid;
   a linkage mechanism at each of opposing sides of the top linkage with respect to the vertical longitudinal center plane of the top, each linkage mechanism being pivotably mounted on the respective vehicle-fixed single-part or multipart main bearing; and
   a main drive arranged on the vehicle-fixed single-part or multipart main bearing and driving said link mechanisms, wherein each of the link mechanisms of the storage space lid is driven by the main drive arranged on the respective vehicle-fixed single-part or multipart main bearing, wherein the main drive drives a drive wheel, which is rotatably mounted on the vehicle-fixed single-part or multipart main bearing and connected to the link mechanism of the storage space lid via a first drive link mechanism and connected to the linkage mechanism of the top linkage via a second drive link mechanism, wherein via a third drive link mechanism, the drive wheel is connected to a rear-window link for adjusting a rear window, said rear-window link being pivotably mounted on the vehicle-fixed single-part or multipart main bearing.

2. The top according to claim 1, wherein the drive wheel is a gear wheel or a gear wheel segment driven by a drive pinion of the main drive.

3. The top according to claim 1, wherein each link mechanism of the storage space lid is a four-bar mechanism connected to a base structure of the storage space lid.

4. The top according to claim 3, wherein the storage space lid has a lid plate pivotably mounted on the base structure.

5. The top according to claim 1, wherein on each of the opposing sides of the storage space lid, the storage space lid is provided with a linkage exit flap, which is swung downward into an open position when the top linkage is in the closed position and which can be pivoted into a cover position, in which it covers the storage space, when the top linkage is in the storage position.

6. The top according to claim 5, wherein a drive motor for the linkage exit flaps is arranged on the storage space lid.

7. The top according to claim 6, wherein the drive motor is coupled to each of the linkage exit flaps via a push rod.

8. The top according to claim 6, wherein when the drive motor is actuated, it adjusts the lid plate of the storage space lid in relation to the base structure thereof about a pivot axis, which extends in the transverse direction of the top, via a lever mechanism.

9. A top of a convertible vehicle, said top comprising:
   a top linkage adjustable between a closed position, in which a vehicle interior is covered, and a storage position, in which the vehicle interior is open to the top and the top linkage is stored in a rear-side storage space;

an adjustable storage space lid closable over the rear-side storage space;

a linkage exit flap on each of opposing sides of the adjustable storage space lid with respect to a vertical longitudinal center plane of the top, the linkage exit flaps being adjustable between an open position, in which the linkage exit flaps are swung downward, and a cover position, in which the linkage exit flaps are swung upward;

a linkage mechanism on each of opposing sides of the top linkage with respect to the vertical longitudinal center plane of the top, each linkage mechanism being pivotably mounted on a respective vehicle-fixed single-part or multipart main bearing, wherein the storage space lid includes a base structure and a lid plate, the lid plate being pivotable in relation to the base structure, and that the lid plate and the linkage exit flaps are pivotable in relation to the base structure via a shared drive motor.

10. The top according to claim 9, wherein the drive motor is arranged on the base structure.

11. The top according to claim 9, wherein the drive motor is connected to each of the linkage exit flaps and the lid plate via a push rod.

12. The top according to claim 11, wherein each push rod is connected to a coupling element of a drive shaft of the drive motor via a spherical head.

13. The top according to claim 11, wherein the push rod for the lid plate is connected to a lever mechanism linked to the base structure at one side and to the lid plate at the other side.

14. The top according to claim 1, wherein the top is a folding top, which has a top cover, and the top linkage includes a rear-side tensioning bow pivotably mounted on the vehicle-fixed single-part or multipart main bearings arranged on both sides of the storage space lid and/or interconnects the linkage mechanisms arranged on both sides of the top linkage.

* * * * *